US010086993B2

(12) United States Patent
Hudalla et al.

(10) Patent No.: US 10,086,993 B2
(45) Date of Patent: Oct. 2, 2018

(54) CONVEYING SYSTEM FOR INJECTING MATERIAL AT A CONVEY LINE PRESSURE

(71) Applicant: Nol-Tec Systems, Inc., Lino Lakes, MN (US)

(72) Inventors: Vernon R. Hudalla, Belmont, NC (US); Erik W. Johnson, Mendota Height, MN (US); Michael G. Thiel, Minneapolis, MN (US)

(73) Assignee: Nol-Tec Systems, Inc., Lino Lakes, MN (US)

( * ) Notice: Subject to any disclaimer, the term of this patent is extended or adjusted under 35 U.S.C. 154(b) by 60 days.

(21) Appl. No.: 14/770,933

(22) PCT Filed: Feb. 27, 2014

(86) PCT No.: PCT/US2014/019070
§ 371 (c)(1),
(2) Date: Aug. 27, 2015

(87) PCT Pub. No.: WO2014/134327
PCT Pub. Date: Sep. 4, 2014

(65) Prior Publication Data

US 2016/0016729 A1 Jan. 21, 2016

Related U.S. Application Data

(60) Provisional application No. 61/770,207, filed on Feb. 27, 2013.

(51) Int. Cl.
*B65D 88/54* (2006.01)
*B01D 53/00* (2006.01)
(Continued)

(52) U.S. Cl.
CPC ............. *B65D 88/54* (2013.01); *B01D 53/00* (2013.01); *B01D 53/10* (2013.01);
(Continued)

(58) Field of Classification Search
CPC ...... B65G 53/16; B65D 88/54; B65D 88/548; B65D 88/26; B01D 2259/40005
(Continued)

(56) References Cited

U.S. PATENT DOCUMENTS 2,919,159 A * 12/1959 Lacroix .................. B65G 53/00 406/137
3,190,509 A 6/1965 Kirchhoefer
(Continued)

FOREIGN PATENT DOCUMENTS

FR 1316052 A * 1/1963 ............ B01J 8/0035

OTHER PUBLICATIONS

FLSmidth, "Reagent Injection Technology", FLSmidth Inc., Jun. 2008 (2 pages).

(Continued)

*Primary Examiner* — Glenn F Myers
(74) *Attorney, Agent, or Firm* — Deirdre M. Kvale; DMK Intellectual Property Law PLLC

(57) ABSTRACT

A conveying system for injecting material at a convey line pressure is disclosed. Material is injected into the convey line through a feed device from a pressurized vessel pressurized at the convey line pressure. In illustrated embodiments, the vessel is pressurized at the convey line pressure through connection to the convey line. As described, the vessel is connected to the convey line through a pressurization line to pressurize the vessel at the convey line pressure. In illustrated embodiments described the pressurization line is opened and closed via a valve to control pressurization of the vessel at the convey line pressure. In illustrated embodiments, convey line pressure is applied to multiple vessels of a conveying system through one or more pressurization lines to inject material into the convey line.

20 Claims, 9 Drawing Sheets

(51) Int. Cl.
*B01D 53/10* (2006.01)
*B65G 53/16* (2006.01)

(52) U.S. Cl.
CPC .................. *B01D 2253/102* (2013.01); *B01D 2257/2045* (2013.01); *B01D 2257/2047* (2013.01); *B01D 2257/302* (2013.01); *B01D 2257/602* (2013.01); *B01D 2258/0283* (2013.01); *B01D 2259/128* (2013.01); *B65G 53/16* (2013.01)

(58) Field of Classification Search
USPC .............................................................. 141/5
See application file for complete search history.

(56) References Cited

U.S. PATENT DOCUMENTS

| | | | | | |
|---|---|---|---|---|---|
| 3,515,672 | A | | 6/1970 | Reinish | |
| 3,938,848 | A | * | 2/1976 | Krambrock | B65G 53/521<br>134/37 |
| 4,060,183 | A | | 11/1977 | Puurunen | |
| 4,136,857 | A | | 1/1979 | Kolb | |
| 4,205,931 | A | * | 6/1980 | Singer | F23J 3/06<br>110/216 |
| 4,341,107 | A | | 7/1982 | Blair | |
| 4,427,135 | A | | 1/1984 | MacKay | |
| 4,488,837 | A | | 12/1984 | Mizokawa | |
| 4,490,077 | A | * | 12/1984 | Shimada | G01F 1/74<br>406/124 |
| 4,528,848 | A | | 7/1985 | Hafner | |
| 4,582,454 | A | | 4/1986 | Brandenburg | |
| 4,850,703 | A | * | 7/1989 | Hanaoka | B01F 15/00253<br>222/135 |
| 4,883,390 | A | | 11/1989 | Reintjes | |
| 5,240,324 | A | | 8/1993 | Phillips | |
| 5,365,950 | A | * | 11/1994 | Yoshimoto | A24B 3/182<br>131/291 |
| 55,765,499 | | | 11/1996 | Davies | |
| 5,670,751 | A | | 9/1997 | Hafner | |
| 5,738,249 | A | * | 4/1998 | Kikuchi | B01J 8/002<br>222/148 |
| 5,775,852 | A | | 7/1998 | Boutte | |
| 6,500,238 | B1 | * | 12/2002 | Brandes | B01D 53/04<br>95/148 |
| 6,979,116 | B2 | | 12/2005 | Cecala | |
| 2006/0056924 | A1 | * | 3/2006 | Jurkovich | B65G 53/66<br>406/39 |
| 2007/0014185 | A1 | | 1/2007 | Diosse | |
| 2008/0124179 | A1 | * | 5/2008 | Fleckten | B65G 53/528<br>406/50 |
| 2009/0304461 | A1 | * | 12/2009 | Strohschein | B65G 53/521<br>406/11 |
| 2010/0193077 | A1 | * | 8/2010 | Nelson | B65D 88/121<br>141/350 |
| 2016/0009488 | A1 | | 1/2016 | Hudalla | |
| 2016/0202110 | A1 | | 7/2016 | Johnson | |

OTHER PUBLICATIONS

FLSmidth, “Reagent Handling Systems for the Power Industry”, FLSmidth Inc., Mar. 2006 (6 pages).

Vanderwerff, Dry Bulk Sorbent Injection System, Nol-Tec Systems, 2009 http://www.nol-tecasia.com.sg/pdf/dry-sorbent-injection-mitigation-system.pdf (2 pages).

Notification of Transmittal of International Search Report/Written Opinion, Search Report and Written Opinion for PCT/US2014/019004, dated Jul. 1, 2014 (7 pages).

Notification of Transmittal of International Search Report/Written Opinion, Search Report and Written Opinion for PCT/US2014/052160, dated Dec. 17, 2014 (8 pages).

Nol-Tec Systems, Inc. USPTO Office Action, U.S. Appl. No. 14/913,290, dated Sep. 28, 2017 (8 pages).

USPTO Office Action, U.S. Appl. No. 14/913,290, dated Jan. 25, 2018 (8 pages).

USPTO Office Action, U.S. Appl. No. 14/771,027, dated Jan. 26, 2018 (12 pages).

USPTO Office Action, U.S. Appl. No. 15/475,549, dated Apr. 4, 2018 (13 pages).

* cited by examiner

CONVEYING SYSTEM FOR INJECTING MATERIAL AT A CONVEY LINE PRESSURE

CROSS-REFERENCE TO RELATED APPLICATIONS

The present application claims priority to U.S. Provisional Application Ser. No. 61/770,207 filed Feb. 27, 2013 for a MATERIAL DELIVERY SYSTEM FOR SORBENT MATERIALS AND POWDERS" the content of which is incorporated in its entirety into this application.

BACKGROUND

Ever increasing environmental concerns have led industrial boilers and electric generating units (EGUs) to seek reliable cost-effective methods to control sulfur and mercury emissions. Dry bulk sorbent injection systems have been used to mitigate $SO_2$, $SO_3$, Hg, HCl, and HF emissions from these large industrial boilers. These systems convey dilute phase or sorbent materials, such as powder activated carbons from storage bins or vessels through a convey line to injection ports on boiler flue gas ducts to reduce acid gases and mercury. The injected sorbent material captures with the pollutants in the flue gas to effectively and efficiently reduce emissions. Typically sorbent material is dispensed from a vessel or hopper through an inlet to the convey line. Convey pressure is supplied to the convey line through a blower to transport the sorbent material or powder from the inlet to the injection ports. Back pressure along the convey line can interfere with powder discharge from the vessel or storage bin and limit the magnitude of convey pressure supplied to the line. The discussion above is merely provided for general background information and is not intended to be used as an aid in determining the scope of the claimed subject matter.

SUMMARY

The present application generally relates to an injection system having application for delivery or injection of dilute phase or sorbent materials to a flue duct for pollution control. In illustrated embodiments, the material is injected into a convey line at a convey line pressure to facilitate higher convey pressures. Material is injected into the convey line from a vessel pressurized at the convey line pressure through a feed device. In illustrated embodiments, the vessel is pressurized at the convey line pressure through connection to the convey line via a pressurization line upstream of the vessel. In illustrated embodiments described, the pressurization line is opened and closed via a valve to control pressurization of the vessel through the pressurization line. The pressurization line provides a reliable means to pressurize the vessel at the convey line pressure without complex controls. In embodiments disclosed, multiple vessels are pressurized at the convey line pressure through one or more pressurization lines to inject material into the convey line. This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF ILLUSTRATIVE EMBODIMENTS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
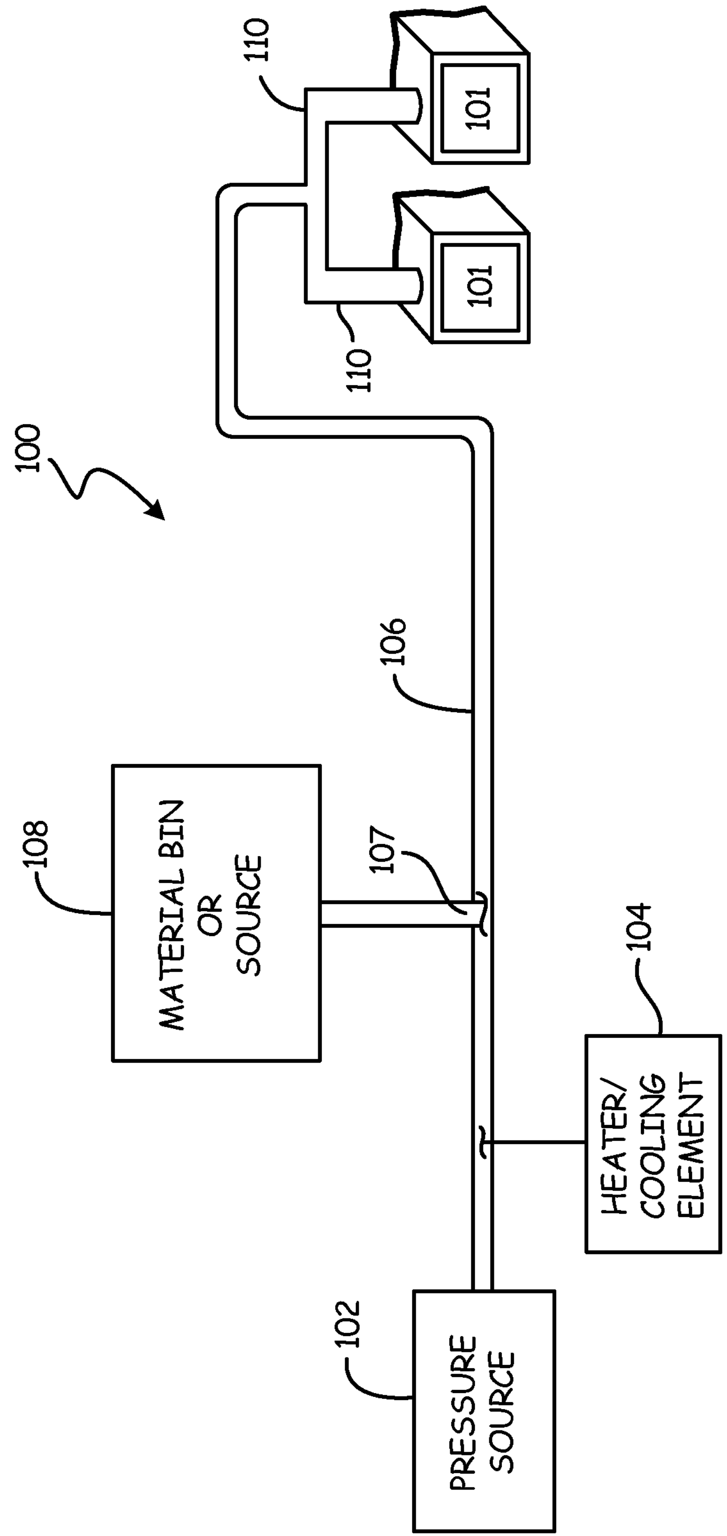
FIG. 1 illustrates a material delivery system for injecting sorbent or dilute phase materials into a convey line or duct.

The present application relates to a material delivery system 100 for sorbent or dilute phase materials as schematically illustrated in FIG. 1. In illustrated applications shown in FIG. 1, the material delivery system is used to deliver fluidized sorbent materials or powder for injection into a gas stream of flue or duct 101 of a boiler to reduce emissions of certain gases. Illustrative sorbent material includes powder activated carbon or other fluidizable material. As schematically shown in FIG. 1, the system includes a pressure source or blower 102 and a heater element 104 to provide temperature controlled pressurized air to convey line 106 upstream from an inlet port 107 for sorbent material or powder. In an alternate embodiment, element 104 is a cooling element to cool the air. The sorbent material or powder is supplied from source or bin 108 into the convey line 106 downstream from the pressure source or blower 102 to convey the fluidized material or powder for injection into the flues or ducts 101 to neutralized pollutants or gases discharged to the flue or ducts 101. The fluidize material from convey line 106 is split into multiple feed lines 110 for injection into multiple ducts or flues 101 as shown. Pressure loss (e.g. at inlet 107) or back pressure along the convey line 106 can reduce available line pressure and flow rate of the material.

Figure 2A:
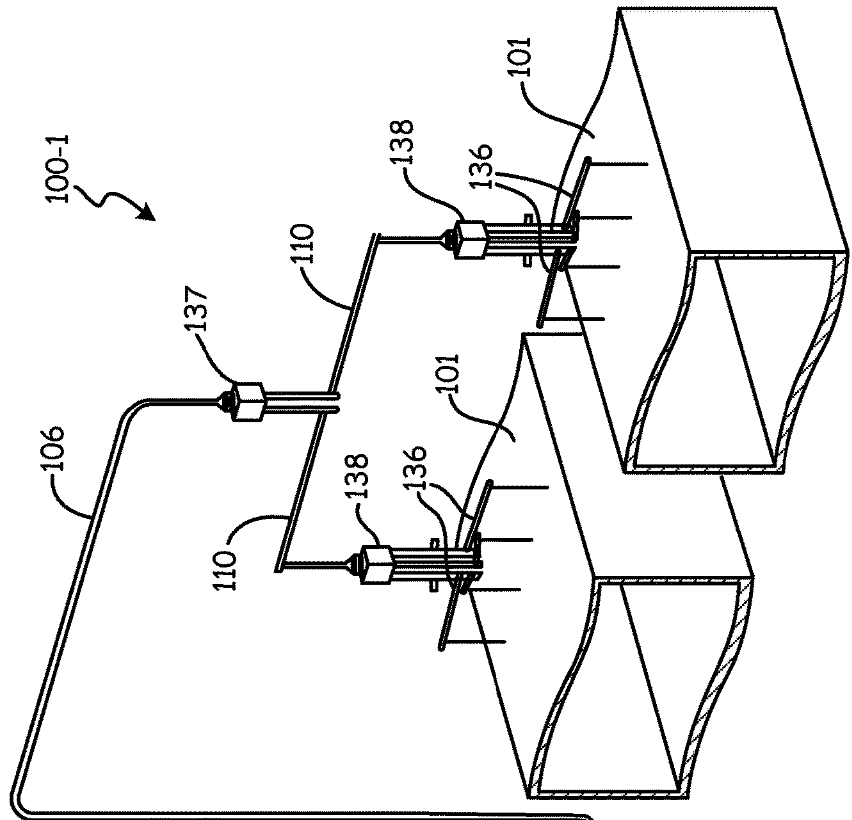
FIGS. 2A-2D illustrate one embodiment of a material delivery system utilizing a rotary feed device to inject material into the convey line.
Figure 2B:
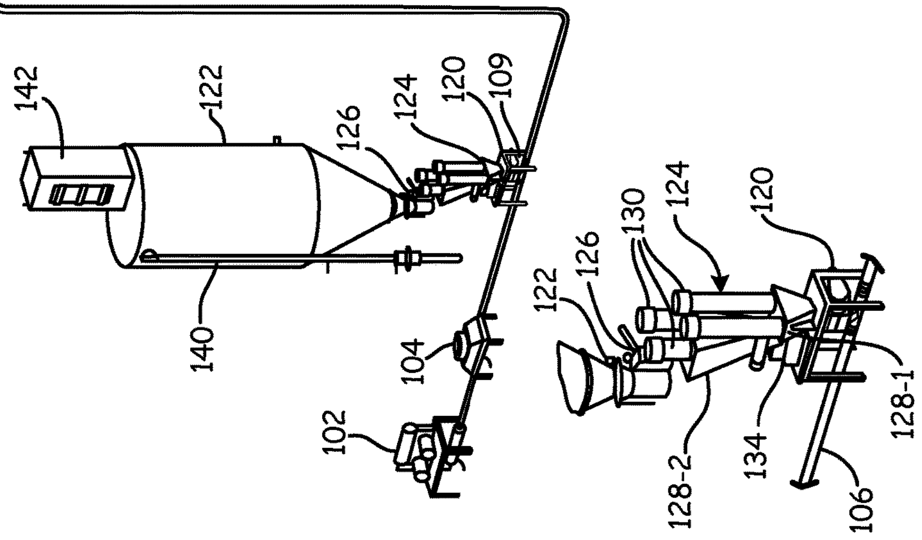

FIGS. 2A-2B illustrate a more detailed embodiment of a delivery system 100-1 utilizing a rotary feed device 120 to dispense material to the pressurized air stream where like numbers are used to refer to like parts in the previous FIG. As previously described, the convey line 106 is pressurized via pressure blower or source 102 and heated or cooled via the heat exchanger or cooling element 104 upstream of the sorbent material inlet 109. The sorbent material is stored in bin or silo 122 for discharge to a vented vessel assembly 124 for injection into the convey line 106. The flow of material from the bin 122 to the vented vessel assembly 124 is controlled via operation of fill valve 126. Illustratively, the fill valve 126 is a pneumatic valve which opens and closes a discharge outlet to fill and discharge material from the bin 122 to the vented vessel assembly 124. The fill valve 126 is opened to fill the vented vessel assembly 124. The fill valve 126 is closed when the fill cycle is complete. As shown, the vented vessel assembly 124 includes vessels 128-1, 128-2 each of which is vented to atmosphere through dust filters 130. Material is dispensed from vessel 128-1 to vessel 128-2 into the convey line 106 through the rotary feed device 120.

The flow rate of material dispensed is measured utilizing a loss in weight feed system 134. The system 134 uses load cells to measure loss of weight of material with respect to time to determine a material flow rate injected into the convey line 106. As shown, fluidized material from feed lines 110 is split to injection lances 136 for delivery to the ducts or flues 101 as shown. In an illustrated embodiment, the convey line 106 splits into feed lines at splitter 137 and into injection laces 136 at splitter 138. Splitters 137, 138 include an orifice designed to provide a uniform back pressure at the split.

The bin or silo 122 as shown in FIG. 2A is filled from a truck through fill line 140. As shown the bin or silo 122 includes dust collector 142 to reduce contaminants. In addition to the pneumatic fill valve, bin or silo 122 includes a manual maintenance valve to provide manual access and control to open and close the discharge outlet from bin 122. Although illustrated embodiments described herein employ pneumatic valves and devices, application is not limited to pneumatic valves and other valves such as electric or hydraulic valves can be used as appreciated by those skilled in the art. In illustrated embodiments, the fill valve 126 is opened to fill the vessels 128 in response to a low material weight. As shown, the rotary feed device 120 and dispensing components are coupled to the convey line 106 through a flexible line adapter to assembly components of the material dispensing system to the convey line 106.

Figure 2C:
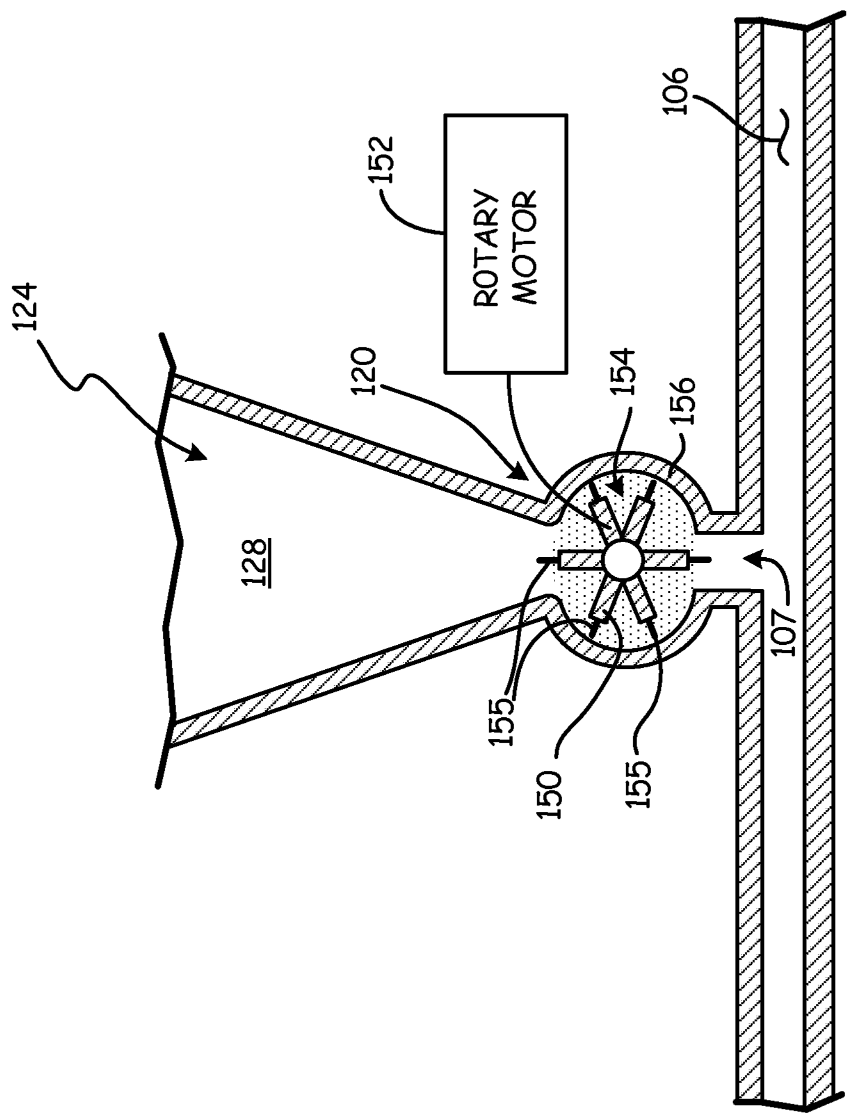
Figure 2D:
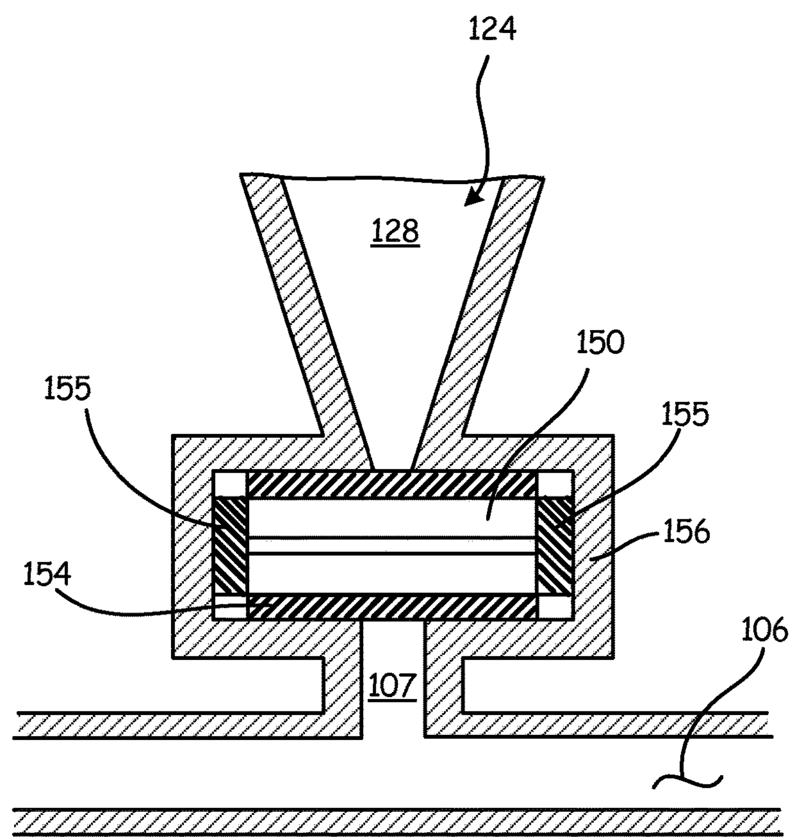

As shown in FIGS. 2A-2B, the rotary feed device 120 is disposed between an outlet from the vented vessel assembly 124 and convey line 106 to supply material to the convey line 106. As shown in more detail in FIG. 2C, the rotary feed device 120 forms a rotary air lock valve which includes rotary vanes 150 rotated through a motor assembly 152 illustrated diagrammatically in FIG. 2C. The vanes 150 rotate in chamber 154 disposed between the vessel 128 and convey line 106. As schematically shown, tips of the vanes 150 include flaps 155 to reduce clearance between the vanes 150 and chamber walls 156. The reduced clearance limits air leakage from the convey line 106 through the rotary feed device 120 which interferes with injection of material into the convey line 106. In particular, the flaps 155 are formed of a rubber or flexible material to provide a near zero clearance airlock to inject material into the convey line 106. In illustrated embodiments, flaps 155 are on the ends of the vanes 150 to reduce air leakage at ends of chamber 154 as shown in FIG. 2D. The near zero clearance airlock facilitates an increased convey line pressure without adversely affecting the injection of material into the convey line 106. In particular, air leakage across the rotary feed device 120 increases with convey line pressure which adversely affects the material dispensing process into the convey line 106.

In an illustrated embodiment, the near zero clearance air lock permits an approximate 3-6 psi increase in convey line pressure without adverse affect to the material dispensing process. Thus, in an illustrated embodiment, the system employs a convey line pressure as high as approximately 10-12 psi. In another embodiment, vanes 150 are covered with felt or other compressible material to reduce clearance as described. As schematically shown, in an illustrated embodiment, vanes 150 are coated with a corrosive or erosion resistance material to protect from corrosion and erosion. Although, a particular rotary feed device 120 is described, application is not limited to the particular rotary feed device as shown.

Thus, as previously described, fill valve 126 is opened to fill vessels 128. While the vessel 128 is filling, the rotary feed device 120 operates to inject material into the convey line 106. The flow rate of material dispensed via the rotary feed device 120 during the fill process is determined utilizing a volumetric flow rate calculation while when the fill valve is closed, the flow rate is determined utilizing a loss of weight. In the illustrated embodiments, the rotary feed device 120 has a variable speed to control the rate of material dispensed using volumetric or loss of weight input. Table I illustrates filling and dispensing sequence for the vessel assembly 124 illustrated in FIGS. 2A-2B where $t_1>t_2>t_3$.

TABLE I

| Time 1 ($t_1$) | Time 2 ($t_2$) | Time 3 ($t_3$) |
|---|---|---|
| Fill valve open to fill vessel | Fill valve closed | Fill valve open to fill vessel |
| Rotary feed device operating to dispense material | Rotary feed device operating to dispense material | Rotary feed device operating to dispense material |

Figures 3A, 3B:
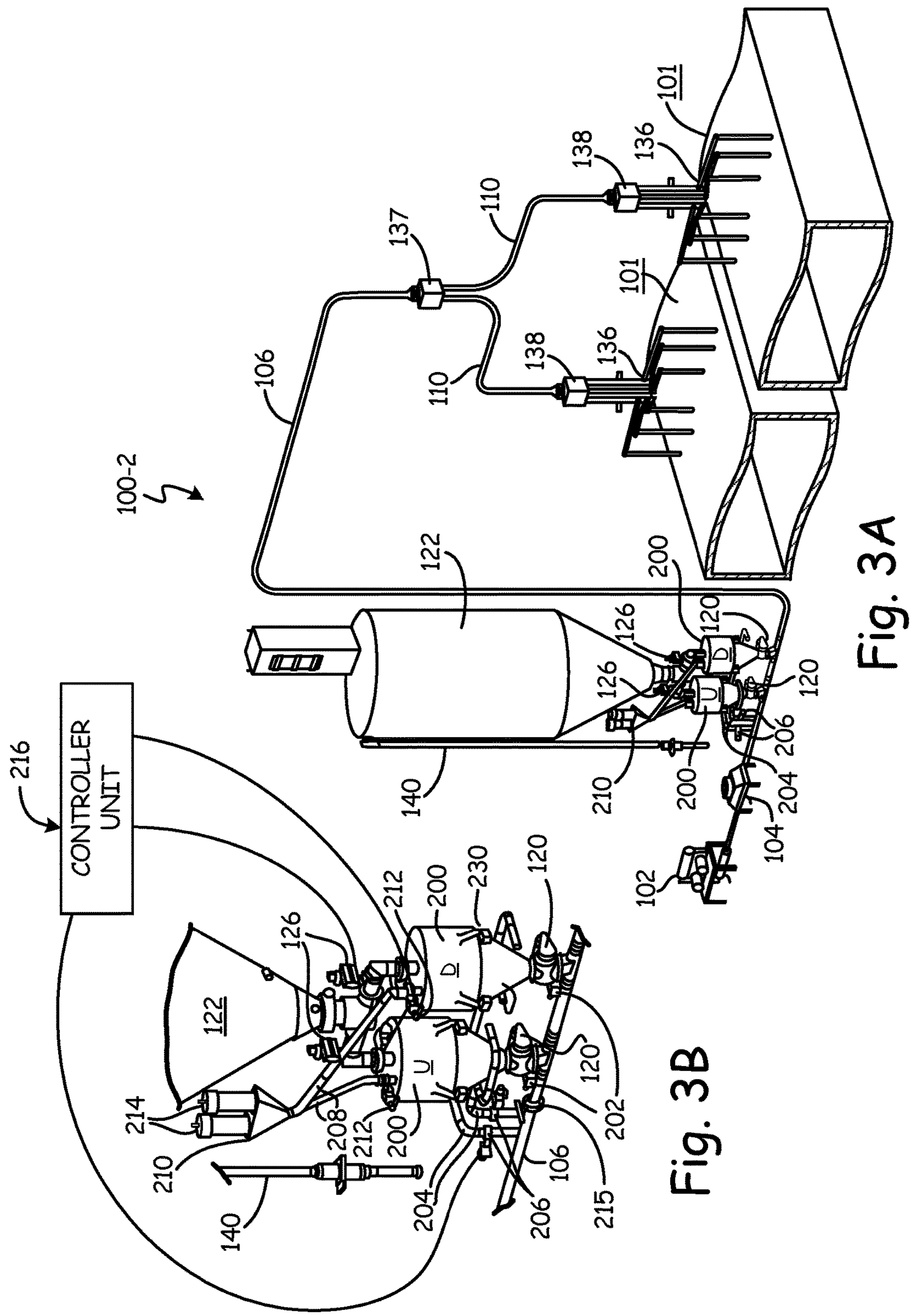
FIGS. 3A and 3B illustrate another embodiment of a material delivery system utilizing a rotary feed device and multiple pressurized vessels or hoppers.

FIGS. 3A and 3B illustrate another embodiment of a delivery system 100-2 utilizing rotary feed devices 120 to dispense material to the pressurized air stream wherein like numbers are used to refer to like parts in the previous FIGS. As shown, the system includes multiple pressurized vessels 200 (i.e. upstream vessel 200 U and downstream vessel 200 D) configured to receive material from bin or silo 122 through multiple fill valves 126 coupled to feed lines connected to each of the pressurized vessels 200U and 200D. Vessels 200 are coupled to convey line 106 in parallel through the rotary feed devices 120. Material is discharged from each of the upstream and downstream vessels 200 through the rotary feed devices 120 to convey line 106 as previously described with respect to FIG. 2C. As shown, the rotary feed devices 120 are coupled to the convey line 106 through isolation valves 202 to close vessels 200 from the convey line 106 for filling. As shown, vessels are pressurized via air pressure from convey line upstream of the inlet ports. Additionally, the vessels include aeration pads or devices to aerate the vessels 200.

The vessels 200 are pressurized at a convey line pressure to equalize the pressure between the convey line 106 and the rotary feed devices 120 or vessels to limit the pressure differential between the vessels 200 and convey line 10 to inject the fluidized material or power. In the embodiment, the pressure source is provided from the convey line pressure. In the embodiment shown in FIGS. 3A-3B, pressurized air is provided from the convey line 106 to vessels 200 via pressurization lines 204 to pressurize the vessels 200 at the convey line pressure. Pressurized air flow to the vessels 200 via the pressurization lines 204 is controlled through operation of pressurization valves 206. Prior to filling the vessels 200 with material from bin or silo 122, vessels are vented to atmosphere through vent lines 208 connected to vent hopper 210. Vent lines 208 are opened and closed through vent valves 212 to selectively vent each of the vessels 200 to atmosphere. Vent lines 208 are closed to pressurize the vessels 200. Vent hopper 210 is opened to atmosphere through dust filters 214 to reduce contaminant in the convey line 106. In the embodiment illustrated in FIGS. 3A-3B, a manual throttle valve 215 is provided in the convey line 106 downstream of the pressurization lines 204 and upstream of the feed device 120 to control the flow rate across injection points and the pressure in the convey line 106 upstream of the rotary feed devices 120.

Operation of the rotary air lock valve 120, pressurization valves 206, vent valves 212, fill valves 126 and isolation valves 202 is controlled via a controller unit 216 including hardware and/or software circuitry. The controller unit 216 operates the fill and vent valves 126, 212 to the upstream and downstream vessels 200U, 200D and the pressurization and isolation valves 202, 206 in sequence to fill and dispense material from the pressurized vessels 200 as illustrated in Table II below where $t_2>t_1$.

TABLE II

| Time 1 ($t_1$) | Time II ($t_2$) |
|---|---|
| Upstream vessel filling (fill and vent valves open - isolation valve closed) Downstream vessel dispensing (isolation and pressurization valves open - fill and vent valves closed) | Downstream vessel filling (fill and vent valves open - isolation valve closed) Upstream vessel dispensing (isolation and pressurization valves open - fill and vent valves closed) |

Figure 4:
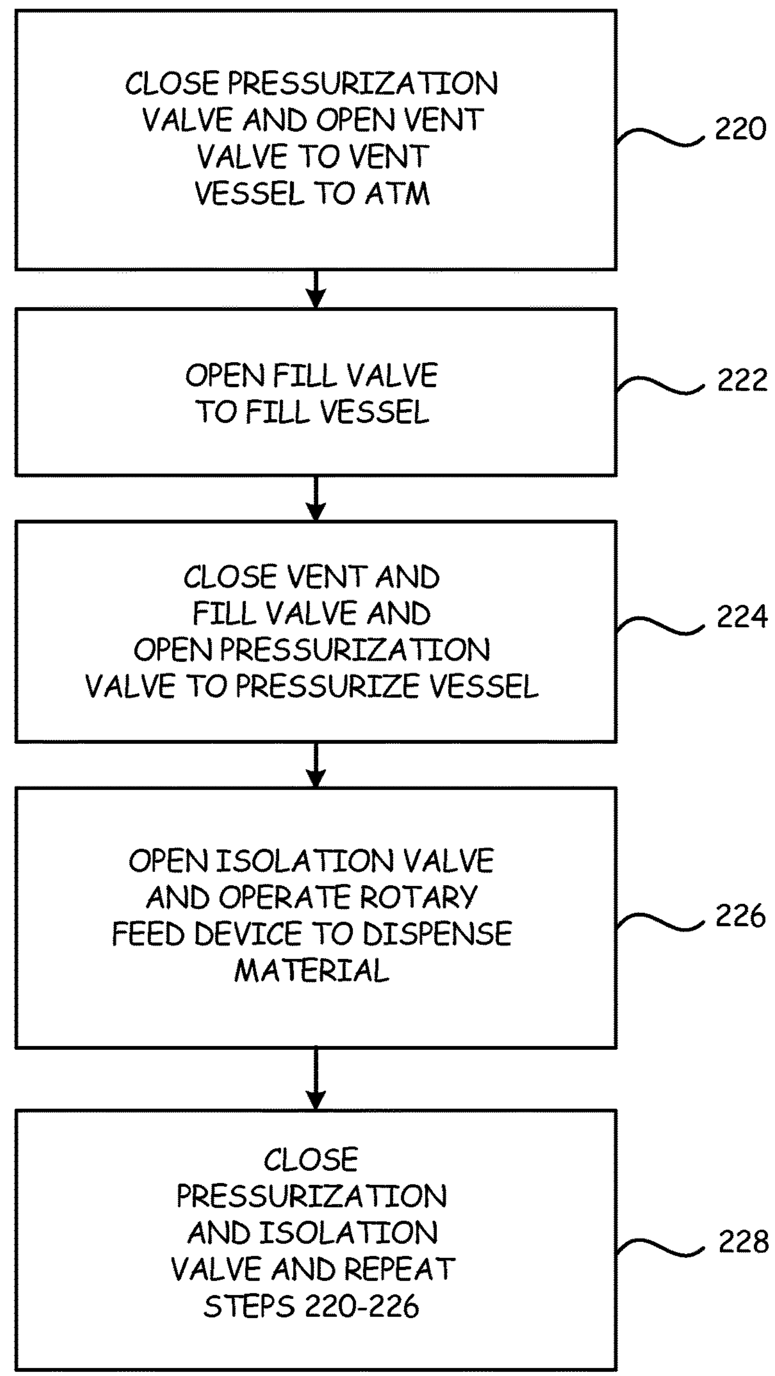
FIG. 4 is a flow chart for alternately filling and dispensing material from the multiple pressurized vessels or hoppers illustrated in FIGS. 3A and 3B

In particular as shown in FIG. 4, in step 220, the pressurization valve 206 is closed and vent valve 212 is opened to vent one of the multiple vessels 200 to atmosphere. In step 222, the fill valve 126 is opened to fill the one vessel. While the vessel is vented, the isolation valve 202 is closed to limit pressure loss across the rotary feed device 120. Thereafter, in step 224, vent valve 212 and fill valve 126 are closed and pressurization valve 206 is opened to pressurize the filled vessel 200. Thereafter in step 226, the isolation valve 202 is opened and the rotary feed device 120 is operated to dispense material from the vessel 200. When the material supply in the vessel 200 is low, the pressurization valve 206 and isolation valve 202 are closed and steps 220-222 are repeated as set forth in step 228 to refill the vessel 200. In illustrated embodiment the process steps 220-228 are coordinated as illustrated in the Table II so that while one vessel is filling the other is discharging material to the convey line 106. The step 228 of refilling the vessel is initiated in response to a drop in weight below a threshold limit as measured by a load cell 230.

In an alternative embodiment both the upstream and downstream vessels 200 U and D are pressurized through one pressurization line coupled to convey line 106 and vessels 200U, 200D. The pressurization line 204 includes a multiple position valve (not shown) to selectively open and close each of the vessels to the convey line 106. In particular in a first valve position, the pressurized air is provided to the upstream vessel 200U and in the second valve position, pressurized air is provide to the downstream vessel 200D to alternately dispense material as previously described. Thus, in illustrated embodiments, one or more valves are used to control pressurization of one or both vessels 200 at the convey line pressure to inject material into the convey line 106.

Figure 5:
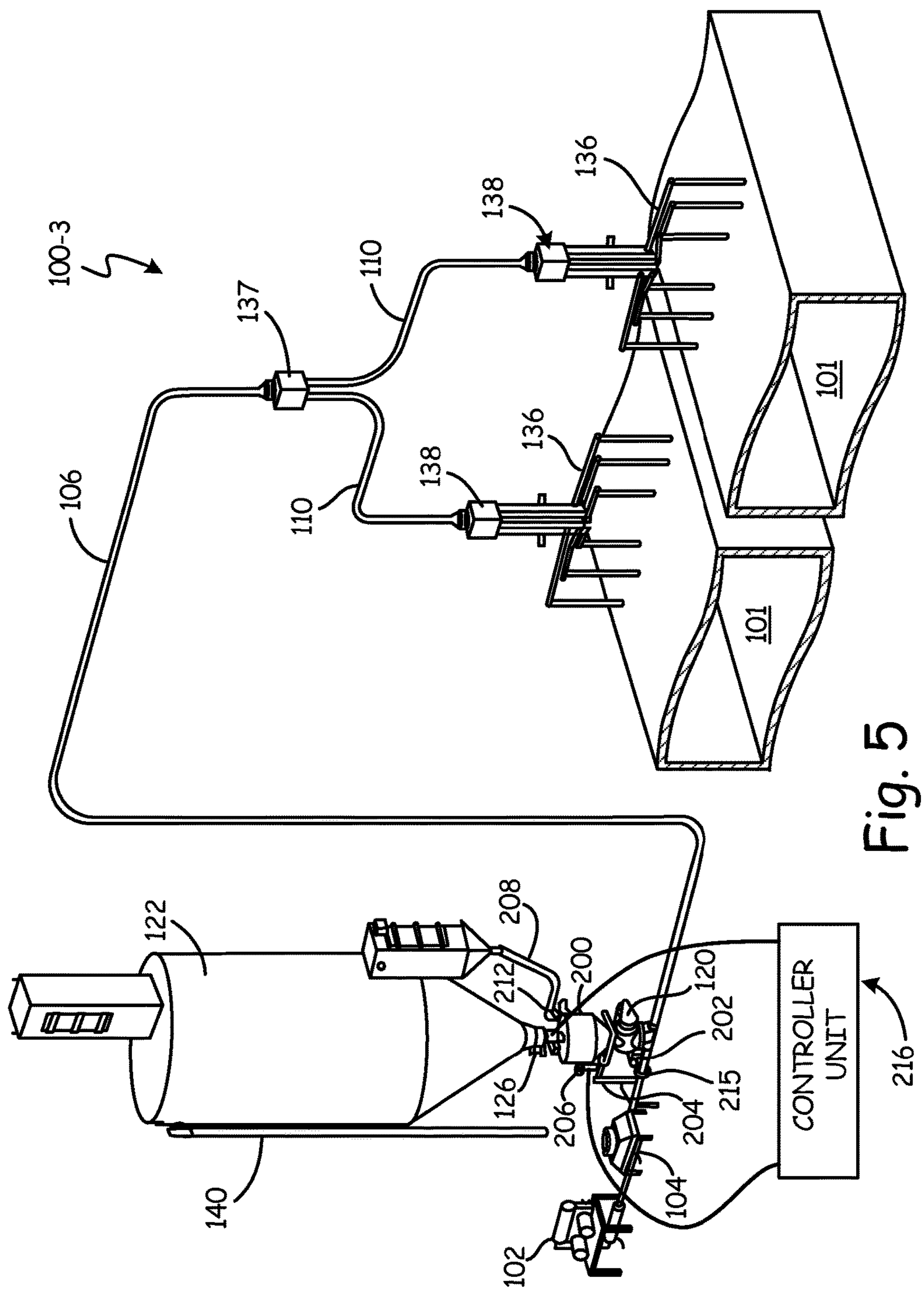
FIG. 5 illustrates another embodiment of a material delivery system utilizing a rotary feed device and a pressurized vessel or hopper.

FIG. 5 illustrates the embodiment of the material delivery system 100-3 including a single pressurized vessel 200 to dispense material to the convey line 106 where like numbers are used to illustrate like parts in the previous FIGS. The pressurized vessel 200 alternates between dispensing and filling functions utilizing the steps of FIG. 4 as illustrated by the table III below where $t_2>t_1$.

TABLE III

| Time 1 ($t_1$) | Time 2 ($t_2$) |
|---|---|
| Vessel dispensing Pressurization valve and isolation valve open - vent valve and fill valve closed | Vessel filling Open vent valve and open fill valve - close pressurization valve and isolation valve. |

The process of alternating between filling and dispensing provides a non-continuous delivery system in contrast to continuous delivery system described in the other embodiments employing multiple vessels.

Figure 6:
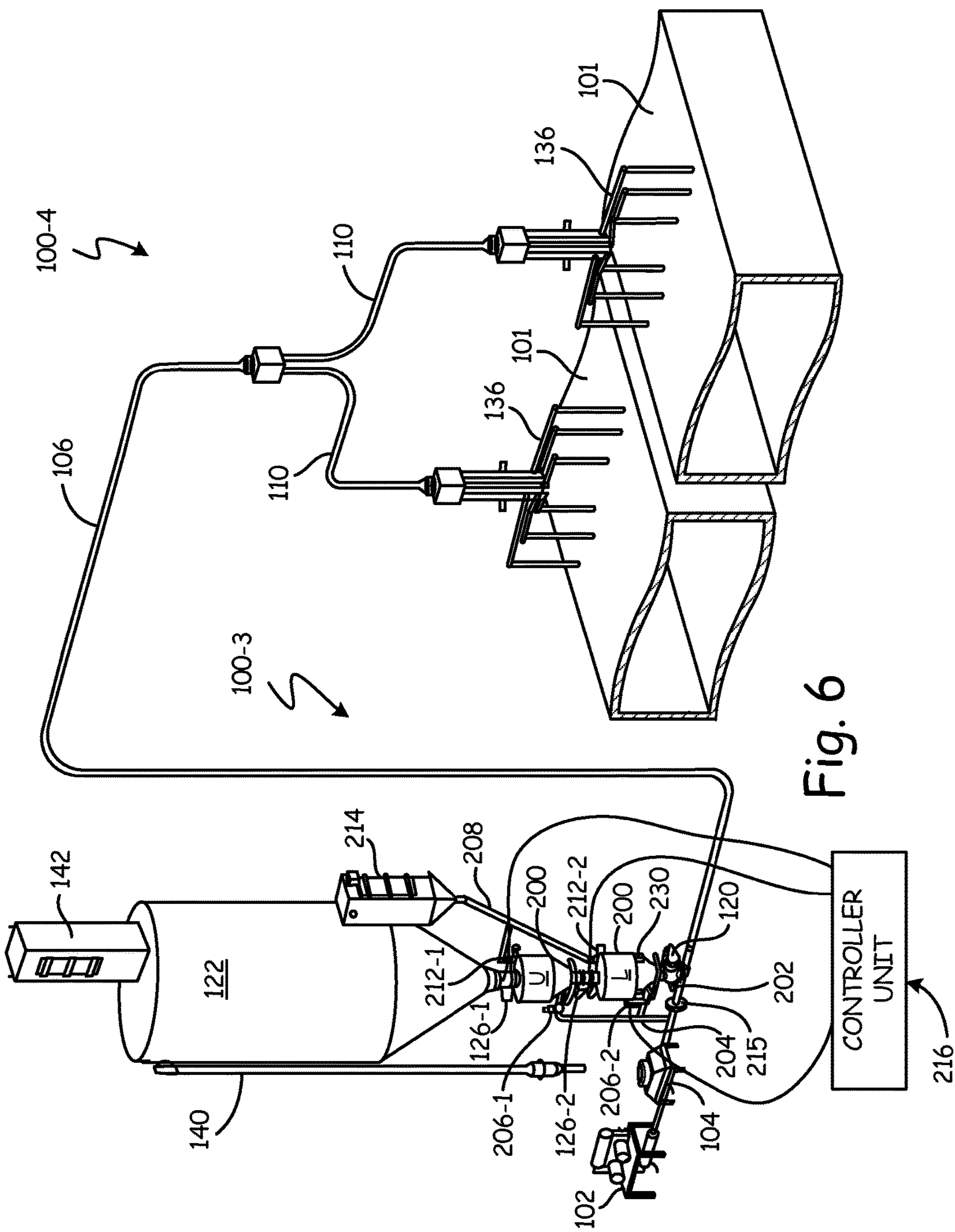
FIG. 6 illustrates another embodiment of a material delivery system utilizing a rotary feed device and multiple pressurized vessels or hoppers.

FIG. 6 illustrates an alternate embodiment of a dispensing system utilizing a rotary feed device 120 to dispense fluidized material into the convey line 106. In the embodiment illustrated upper and lower pressurized vessels 200 are coupled to the bin or silo 122 and convey line 106 in series as shown. The upper and lower vessels 200 provide a continuous material flow as will be described. As shown, the upper vessel U is coupled to bin or silo 122 through fill valve 126-1 and lower vessel L is coupled to upper vessel U through fill valve 126-2 and coupled to convey line 106 through isolation valve 202. Rotary feed device 120 dispenses material from the lower vessel 200L into the convey line 106. A pressurization line 204 is coupled to vessels 200U and 200L through upper and lower pressurization valves 206-1, 206-2 and vent line 208 is coupled to upper and lower vessels through upper and lower vent valves 212-1, 212-2. As illustrated in the table IV below where $t_2>t_1$, while lower vessel dispenses to convey line 106, upper vessel is intermittently filled. In the illustrated embodiment the upper and lower pressurized vessels provide continuous material flow without multiple connections to the convey line to reduce connection to the convey line spacing requirements.

TABLE IV

| Time 1 ($t_1$) | Time 2 ($t_2$) |
|---|---|
| Upper vessel filling -upper fill and vent valves open - lower fill valve closed | Upper vessel dispensing material to lower vessel -lower fill valve open -upper fill valve and upper vent valve closed. |
| Lower vessel dispensing to convey line - lower pressurization valve and isolation valve open | Lower vessel dispensing to convey line -upper pressurization valve and isolation valve open |

Although FIG. 6 illustrates a particular upper and lower structure for pressurizing and venting the upper and lower vessels 200U, 200L, application is not limited to the particular embodiment disclosed.

Figure 7:
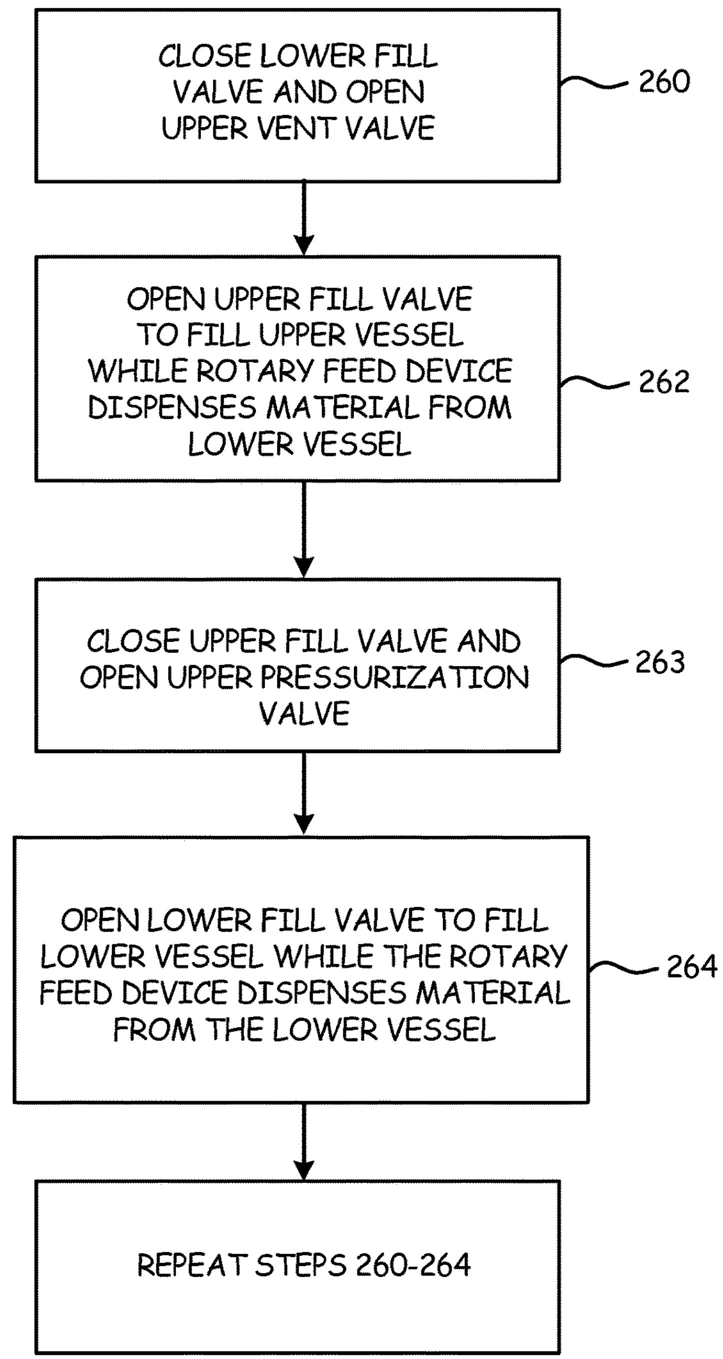
FIG. 7 is a flow chart illustrating a filling sequence for upper and lower vessels or hoppers of the embodiment illustrated in FIG. 6.

FIG. 7 illustrates is a flow chart illustrating process steps for an embodiment for filling the upper and lower vessels in sequence while continuously dispensing material from the lower vessel 200L to the convey line 106. In step 260 the lower fill valve is closed between the upper and lower vessels 200U, 200L and the upper vent valve 212-1 is opened. In step 262 the upper fill valve 126-1 is opened to fill the upper vessel 200U while the rotary feed device 120 operates to dispense material from the lower vessel 200L. As previously described, during dispensing, the isolation valve 202 is open and the lower pressurization valve 206-2 is open to supply pressurized air to the lower vessel 200L. When the material supply in the lower vessel 200L is low as measured by the load cell 230, the lower vessel 200L is filled through the upper vessel 200U.

In particular as illustrated in step 263, the upper fill valve 126-1 is closed and the upper pressurization valve 206-1 is opened to pressurize the upper vessel 200U. In step 264, the lower fill valve 126-2 is opened to supply material from the upper vessel 200U to the lower vessel 200L and the rotary feed device 120 operates to dispense material from the lower vessel 200L into the convey line 106. In one embodiment, the lower pressurization valve 206-2 is closed while the lower fill valve 126-2 is opened to supply material from the upper vessel 200U to the lower vessel 200L. In one embodiment, the lower vent valve 212-2 is opened to fill the lower vessel 200L from the upper vessel 200U or in another embodiment the lower vent valve 212-2 is closed during the filling process. The process steps 260-264 are repeated to refill the upper and lower vessels 200U, 200L to implement the fill cycle as illustrated in Table IV.

Embodiments of the delivery systems described herein have application for fluidizing powders such as powder activated carbon having a particle size of less than 20 microns and dispensing to a convey line with pressures greater than 3 psi. The delivery system would also provide a minimized pressure loss to provide enhanced convey line pressure and flow to provide for example a convey line pressure greater than 3 psi. Embodiments of the delivery systems described herein have application for both industrial and utility boilers as well as other applications. Although the present invention has been described with reference to preferred embodiments, workers skilled in the art will recognize that changes may be made in form and detail without departing from the spirit and scope of the invention. For example, the system for injecting material at the convey line pressure can combine one or more components or features described herein to inject material into a convey line at the convey line pressure as described to implement the system set forth in the claimed subject matter.

What is claimed:

1. An assembly comprising:

at least one vessel having an inlet connectable to a material source;

at least one rotary airlock feed device having an inlet coupled to the at least one vessel and an outlet to connect the at least one vessel to a pressurized convey line through the at least one rotary airlock feed device and the at least one rotary airlock feed device including a plurality of vanes rotatable about a rotation axis in a chamber via a motor assembly to feed material from the at least one vessel through the chamber of the at least one rotary airlock feed device into the convey line;

wherein the at least one vessel includes a first vessel coupled to the material source and coupled to the convey line and a second vessel and the assembly includes:

a first pressurization valve operable between a closed position and an opened position to pressurize the first vessel through at least one pressurization line coupled to the convey line and a second pressurization valve operable between a closed position and an opened to pressurize the second vessel.

2. The assembly of claim 1 wherein the at least one pressurization line includes a first pressurization line between the convey line and the first vessel and a second pressurization line between the convey line and the second vessel and the first pressurization valve opens and closes the first pressurization line to convey line pressure and the second pressurization valve open and closes the second pressurization line to the convey line pressure.

3. The assembly of claim 1 wherein the second vessel is coupled to the material source and coupled to the convey line and the at least one rotary airlock feed device includes a first rotary airlock feed device connecting the first vessel to the convey line and a second rotary airlock feed device connecting the second vessel to the convey line downstream from the first vessel.

4. The assembly of claim 1 wherein the at least one pressurization line includes a first pressurization line coupled to the first vessel and the convey line and a second pressurization line coupled to the second vessel and the first pressurization valve is coupled to the first pressurization line and operable between the closed position and the open position to pressurize the first vessel and the second pressurization valve is coupled to the second pressurization line and operable between the closed position and the open position to pressurize the second vessel.

5. A method comprising:

opening a vent line for a first vessel and filling the first vessel with material while a pressurization valve for a second vessel is open to supply pressure to pressurize the second vessel at a convey line pressure through a pressurization line connecting the second vessel to the convey line upstream of the second vessel and dispensing material from the second vessel into the convey line; and closing the vent line for the first vessel and opening a pressurization valve for the first vessel to pressurize the first vessel to dispense material from the first vessel.

6. The method of claim 5 wherein the first vessel is connected to the convey line upstream of the second vessel and comprising the step of:

opening a vent line for the second vessel and closing the pressurization valve for the second vessel to fill the second vessel while dispensing material from the first vessel into the convey line.

7. The method of claim 5 wherein the second vessel is coupled to the convey line and to a material source through the first vessel and comprising the steps of:

dispensing material from the second vessel during a first time period while the vent line to the first vessel is opened and the pressurization valve for the second vessel is opened to pressurize the second vessel; and dispensing material from the second vessel during a second time period different from the first time period while the vent line for the first vessel is closed and the pressurization valve for the first vessel is opened to pressurize the first vessel.

8. The method of claim 5 wherein the pressurization valve for the first vessel is coupled to a pressurization line connecting the first vessel to the convey line and comprising:

opening the pressurization valve for the first vessel to the connect the first vessel to the convey line to pressurize the first vessel at the convey line pressure.

9. The method of claim 6 and comprising the steps of:

rotating vanes of a first rotary feed device to dispense material from the first vessel; and rotating vanes of a second rotary feed device to dispense material from the second vessel.

10. An assembly comprising at least one vessel having a vessel inlet connectable to a material source;

at least one rotary airlock feed device having an inlet coupled to the at least one vessel and an outlet to connect the at least one vessel to a pressurized convey line through the at least one rotary airlock feed device and the at least one rotary airlock feed device including a plurality of vanes rotatable about a rotation axis in a chamber via a motor assembly to feed material from the at least one vessel through the chamber of the at least one rotary airlock feed device into the convey line:

at least one pressurization valve coupled to at least one pressurization line to pressurize the at least one vessel and the at least one pressurization valve operable between an opened position and a closed position to open and close the at least one pressurization line to pressurize the at least one vessel;

a vent valve and fill valve coupled to the at least one vessel and operable between an opened position and a closed position; and a controller coupled to the pressurization valve, the at least one rotary airlock feed device, the fill valve, and the vent valve and configured to open the pressurization valve and rotate the plurality of vanes of the at least one rotary airlock feed device during a first operating phase and open the vent valve and the fill valve during a second operating phase.

11. The assembly of claim 10 wherein each of the plurality of vanes of the at least one rotary airlock feed device includes a flap formed of a flexible material coupled to the plurality of vanes to reduce clearance between each of the plurality of vanes and a wall of the chamber.

12. The assembly of claim 10 wherein the controller is configured to close the pressurization valve during the second operating phase and close the vent valve and fill valve during the first operating phase.

13. The assembly of claim 10 wherein the at least one vessel includes a first vessel and a second vessel and the at least one pressurization line is coupled to the first vessel to pressurize the first vessel through operation of the at least one pressurization valve and the second vessel is coupled to the convey line through the at least one rotary airlock feed device.

14. The assembly of claim 10 wherein the at least one vessel includes a first vessel and a second vessel and the at least one rotary airlock feed device includes a first rotary feed device operable to dispense material from the first vessel and a second rotary feed device operable to dispense material from the second vessel and the first and second rotary feed devices are coupled to the controller to rotate the plurality of vanes to dispense material from the first and second vessels.

15. The assembly of claim 14 and including a first load cell coupled to the first vessel and a second load cell coupled to the second vessel and the controller is configured to receive input from the first and second load cells to control operation of the first and second rotary airlock feed devices.

16. The assembly of claim 14 wherein the controller is configured to rotate the plurality of vanes of the first airlock feed device and not the plurality of vanes of the second airlock feed device during the first operating phase and the plurality of vanes of the second airlock feed device and not the plurality of vanes of the first rotary feed device during the second operation phase.

17. The assembly of claim 14 wherein the vent valve includes a first vent valve coupled to the first vessel and a second vent valve coupled to the second vessel and the controller is configured to rotate the plurality of vanes of the first airlock feed device and open the second vent valve during the first operating phase and rotate the plurality of vanes of the second airlock feed device and open the first vent valve during the second operation phase.

18. The assembly of claim 10 wherein the at least one vessel includes a first vessel and a second vessel and the at least one pressurization valve includes a first pressurization valve operable between a closed position and an opened position to pressurize the first vessel and a second pressurization valve operable between a closed position and an opened position to pressurize the second vessel and the controller is configured to open the first pressurization valve and not the second pressurization valve during the first operating phase and open the second pressurization valve and not the first pressurization valve during the second operating phase.

19. The assembly of claim 18 wherein the at least one pressurization line includes a first pressurization line coupled to the first vessel and a second pressurization line coupled to the second vessel and at least one of the first and second pressurization lines are coupled to the convey line to provide convey line pressure through operation of one of the first and second pressurization valves.

20. The assembly of claim 18 wherein at least one pressurization line includes a first pressurization line connecting the first vessel to the convey line via operation of the first pressurization valve and a second pressurization line connecting the second vessel to the convey line via operation of the second pressurization valve.

* * * * *